(12) United States Patent
Guy

(10) Patent No.: US 7,907,059 B1
(45) Date of Patent: Mar. 15, 2011

(54) SEWAGE PIPE ALARM SYSTEM AND ASSOCIATED METHOD

(76) Inventor: James Guy, Manorville, NY (US)

( * ) Notice: Subject to any disclaimer, the term of this patent is extended or adjusted under 35 U.S.C. 154(b) by 762 days.

(21) Appl. No.: 11/890,077

(22) Filed: Aug. 3, 2007

Related U.S. Application Data

(60) Provisional application No. 60/821,416, filed on Aug. 4, 2006.

(51) Int. Cl.
*G01F 23/24* (2006.01)
*G08B 21/20* (2006.01)

(52) U.S. Cl. ....... 340/620; 137/392; 137/558; 73/304 R; 73/304 C; 73/290 R

(58) Field of Classification Search ............ 340/620; 137/392, 558; 73/304 R, 304 C, 290 R
See application file for complete search history.

(56) References Cited

U.S. PATENT DOCUMENTS

| | | | | |
|---|---|---|---|---|
| 1,164,882 A * | 12/1915 | Sommer | ............... | 210/86 |
| 3,188,865 A * | 6/1965 | Frost et al. | ............ | 73/304 R |
| 3,582,930 A * | 6/1971 | Wiley | ............... | 340/514 |
| 3,757,316 A * | 9/1973 | Fiorenzo | ............ | 340/608 |
| 3,958,159 A * | 5/1976 | Rauchwerger | ........... | 361/284 |
| 4,027,172 A * | 5/1977 | Hamelink | ........... | 307/118 |
| 4,056,978 A * | 11/1977 | Zimmermann | ........ | 73/304 R |
| 4,547,768 A * | 10/1985 | Kulhavy | ............. | 340/620 |
| 4,949,069 A * | 8/1990 | Wilson | ............. | 340/450.1 |
| 5,025,827 A * | 6/1991 | Weng | ............... | 137/392 |
| 5,079,950 A * | 1/1992 | McKiernan et al. | ........ | 73/313 |
| 5,400,651 A * | 3/1995 | Welch | ............. | 73/290 R |
| 5,719,556 A * | 2/1998 | Albin et al. | ............ | 340/618 |
| 5,793,294 A * | 8/1998 | Schepka | ............. | 340/616 |
| 6,679,286 B2 * | 1/2004 | Kato et al. | ............ | 137/392 |
| 6,820,483 B1 * | 11/2004 | Beckerman | ......... | 73/304 C |
| 2006/0208915 A1 * | 9/2006 | Oakner et al. | ............ | 340/620 |

* cited by examiner

*Primary Examiner* — George A Bugg
*Assistant Examiner* — Anne V Lai

(57) ABSTRACT

A sewage pipe alarm system includes a portable case seated exterior of the existing pipe. The system further includes a mechanism for detecting a blockage of fluid flow within the existing pipe by determining whether an internal water level within the existing pipe exceeds a threshold water level within the existing pipe. The system further includes a mechanism for notifying a user about the blockage of the existing pipe and a power supply source housed within the case. Such a power supply source is electrically coupled to the detecting mechanism and the notifying mechanism respectively.

12 Claims, 5 Drawing Sheets

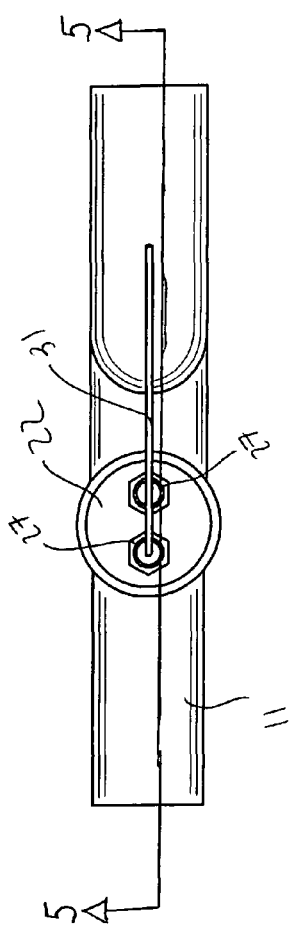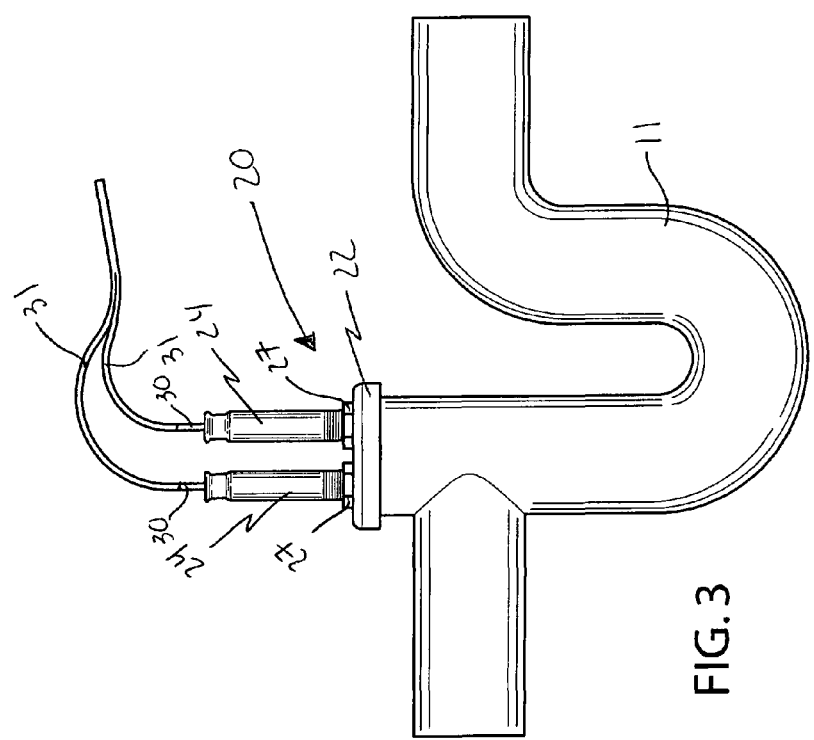

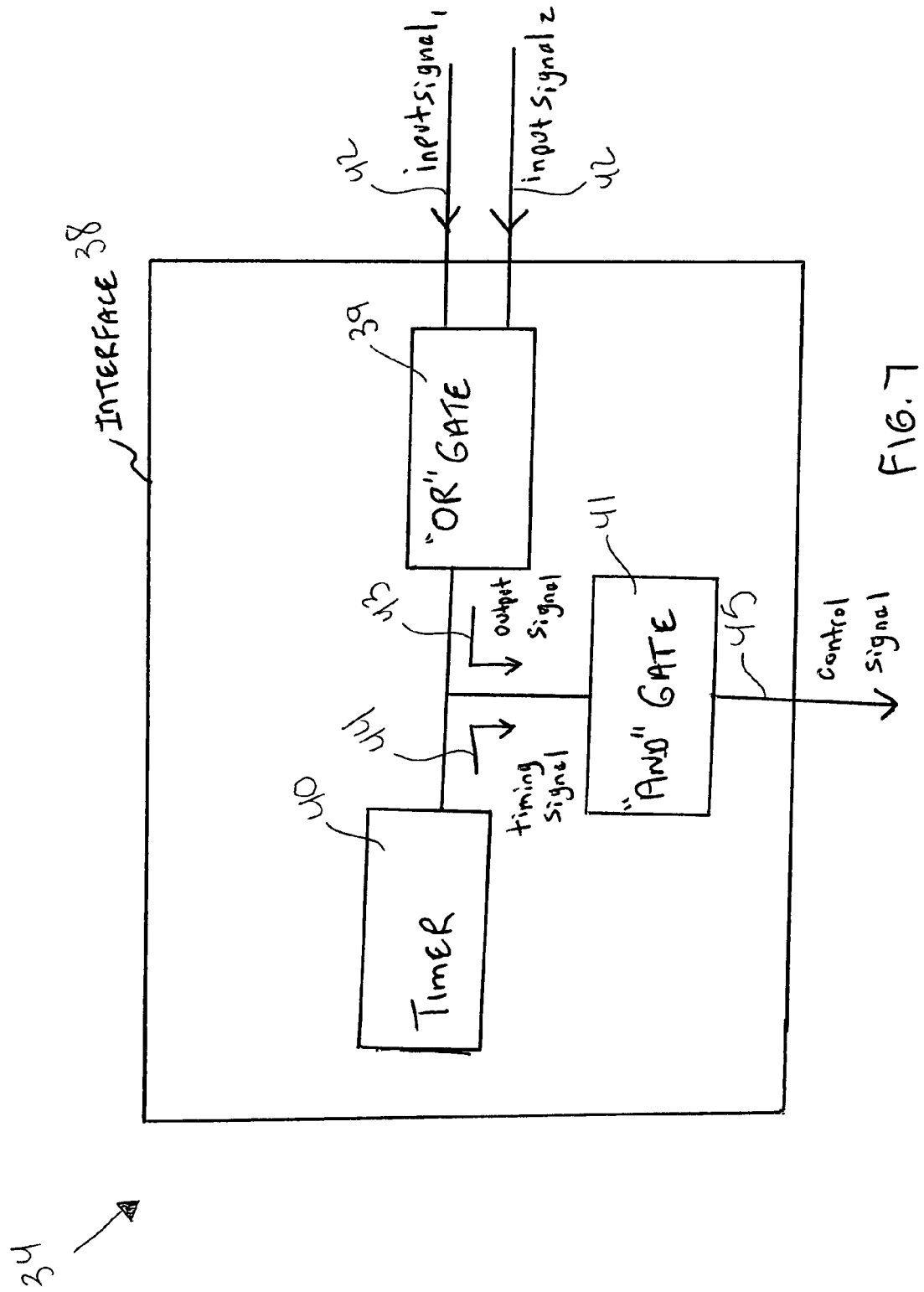

SEWAGE PIPE ALARM SYSTEM AND ASSOCIATED METHOD

CROSS REFERENCE TO RELATED APPLICATIONS

This application claims the benefit of U.S. Provisional Application No. 60/821,416, filed Aug. 4, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to alarm systems and, more particularly, to an alarm system for a sewage pipe and associated method for providing an alert when an existing sewage pipe is partially blocked and experiencing reduced fluid flow therethrough.

2. Prior Art

One of the more unpleasant experiences that anyone can ever undergo is to have sewage back up into a home or business. Regrettably, tales of basements and floors full of black, smelly sewage coming up from toilets, drains and bathtubs are all too common in homes and businesses. Whenever this happens, damage can be extensive and the cost to repair or replace carpet, flooring, and furniture can add up to a lot of money. Many times, the problem is further compounded when homeowners that experience extensive damages because of sewage backups learn that their home insurance policy has a clause which excludes this type of damage from insurance coverage.

Sewage backup is not limited to older homes and can occur in newer homes as well. There are essentially two types of sewage backups. The first (and most common) is caused by tree roots growing into a home's sewage pipelines. The other is caused by municipalities not having sufficient storm sewers to drain all the water in the community, whether it's from a storm or regular use. If you discover that you have sewage backup problems, experts recommend first calling the town's public works department to see if it might be related to municipal sewer lines. Next, call a plumber. Hopefully, the backup problem was not severe enough to cause any major damage but, even if the backup was minor, a lot of inconvenience and being exposed to offensive smells and unsanitary conditions can be experienced. If the sewage backup is severe, the problem is drastically increased. Obviously, it would be advantageous to provide a means for alerting an individual that a potential septic tank or sewage problem exists.

U.S. Pat. No. 4,962,370 to Borriello discloses a sewer alarm that is provided for warning of overflow conditions in a house trap. The sensing mechanism consisting of a magnetic float switch with no moving parts other than the float itself, and the magnetic activating switch is sealed from the hostile environment found in a house trap. The alarm cap member houses the magnetic float switch with physical dimensions similar to a typical cap installed in an unalarmed house trap and substantially has only wires protruding from its exterior face. Unfortunately, this prior art example only activates an alarm when substantial clogging has already occurred within a pipe.

U.S. Pat. No. 4,480,469 to Tice discloses a float-operated electrical switching system with two fluid-level indications and with provisions for mechanical adjustment of the difference in elevation between the two indicating points. The switches are magnetically actuated in accordance with proximity of a permanent magnet carried by the float. The float is guided on an upright magnetically transparent tube which houses the switches, and for at least one of the switches, mechanical adjustment of elevation within the tube is available via external access at the upper end of the tube. Unfortunately, this prior art example does not provide an audible sound to alert a user of existing problems within a pipe system.

U.S. Pat. No. 4,392,128 to Young discloses a sewer back-up alarm apparatus for placement in an existing sewer line connecting a residence to a sewage collection system. The alarm apparatus includes a connection element connected into a sewer line, an adaptor attached to the connection element, and a cap attached in air-tight and water-proof relationship to the adaptor. The adaptor also has an O-ring for sealing the cap to the adaptor, whereby backed up sewage in the sewer pipe forcibly ejects the cap from the adaptor and permits the backed up sewage to flow onto the ground, rather than into the residence. The back-up alarm system also includes first and second electrical conductors extending into the interior of the connection element for electrically contacting backed up sewage to produce reduced electrical resistance between the first and second conductors. An alarm circuit generates an alarm signal in response to a reduced resistance to actuate an audible buzzer. Unfortunately, this prior art example only alerts a user when a problem has already occurred and does not provide a method for preventing such a problem.

Accordingly, the present invention is disclosed in order to overcome the above noted shortcomings. The present invention satisfies such a need by providing a system that is convenient and easy to use, lightweight yet durable in design, and designed for providing an alert when an existing sewage pipe and like conduits are partially blocked and experiencing reduced fluid flow therethrough. The system is designed for detecting problems within a piping system and alerting a user of such problems, thereby enabling a user to use preventative measures to fix problems within the piping system before actual damages occur. The present invention is simple to use, inexpensive, and designed for many years of repeated use.

BRIEF SUMMARY OF THE INVENTION

In view of the foregoing background, it is therefore an object of the present invention to provide a means for providing an alert when an existing sewage pipe and like conduits are partially blocked and experiencing reduced fluid flow therethrough. These and other objects, features, and advantages of the invention are provided by an alarm system for a sewage pipe.

A sewage pipe alarm system includes a portable case seated exterior of the existing pipe. The system further includes a mechanism for effectively detecting a blockage of fluid flow within the existing pipe by determining whether an internal water level within the existing pipe exceeds a threshold water level within the existing pipe. Such a detecting mechanism is connected directly to the existing pipe and extends downwardly therein from a top opening of the existing pipe. The detecting mechanism is electrically coupled to the case and includes a cap removably affixed to the top opening of the existing pipe. Such a cap has a pair of openings formed therein. Such openings are spaced from each other and further, are spaced inwardly from an outer edge of the cap.

The detecting mechanism further includes a pair of coextensively shaped protective casings interfitted within associated ones of the openings such that a top end of each of the protective casings is conveniently disposed above a top surface of the cap while a bottom end of each of the protective casings is simultaneously disposed subjacent to the bottom surface of the cap and within the existing pipe. Each of such protective casings includes a medial region provided with a threaded outer surface and a pair of locking nuts threadably engaged with the threaded outer surface in such a manner that a first one of the locking nuts is seated below the cap and a second one of the locking nuts is seated above the cap. Such locking nuts are abutted directly against top and bottom surfaces of the cap such that the threaded outer surface remains statically situated within a corresponding one of the openings of the cap respectively. Each of the protective casings are vertically displaced along a linear path defined through the openings of the cap when at least one of the locking nuts associated with each of the protective casings are threadably adapted to a loosened position.

The detecting mechanism further includes a pair of linear sensor probes statically nested within associated ones of the protective casings. Each of such sensor probes has a bottom end advantageously terminating below the bottom ends of the protective casings and seated within the existing pipe while respective top ends of the protective probes are situated exterior of the protective casings and outside of the existing pipe. The detecting mechanism further includes a pair of conductive leads with respective first ends connected directly to the top ends of the probes and further with respective second ends connected directly to the notifying mechanism. The detecting mechanism is adjustably connected to the top opening of the existing pipe such that the detecting mechanism is vertically displaced between alternate depths defined within the existing pipe. The detecting mechanism is detachable from the existing pipe while remaining electrically mated to the notifying mechanism.

The system further includes a mechanism for notifying a user about the blockage of the existing pipe. Such a notifying mechanism is housed within the case and electrically coupled to the detecting mechanism and effectively includes a switch electrically coupled to the power supply source, a plurality of transducers housed within the case, and a control signal interface housed within the case and directly coupled to the leads and the transducers respectively. Such a control signal interface includes a first logic gate electrically coupled directly to the leads, a timer electrically coupled directly to the first logic gate, and a second logic gate electrically coupled directly to the timer and the first logic gate respectively.

Each of the sensor probes continuously generates and transmits an input signal when the water level within the existing pipe has reached the threshold water level within the existing pipe. The first logic gate conveniently generates and transmits an output signal to the second logic gate if at least one of the input signals is detected, and the timer continuously generates and transmits a timing signal to the second logic gate. The second logic gate generates and transmits a control signal to the transducers when the first logic gate output signal and the timing signal are received within a predetermined time interval such that the transducers are automatically activated and deactivated when the input signal is received and not received within the predetermined time interval respectively. Each of the sensor probes are vertically oriented and situated parallel to each other and are situated upstream of a U-shaped region in the existing pipe.

The system further includes a power supply source housed within the case. Such a power supply source is advantageously electrically coupled to the detecting mechanism and the notifying mechanism respectively.

A method for alerting a user when an existing sewage pipe is partially blocked and experiencing reduced fluid flow therethrough includes the steps of: providing a portable case seated exterior of the existing pipe; detecting a blockage of fluid flow within the existing pipe by determining whether an internal water level within the existing pipe exceeds a threshold water level within the existing pipe; and when the blockage is detected, notifying a user about the blockage of the existing pipe.

The method further includes the steps of removably affixing a cap to the top opening of the existing pipe. Such a cap has a pair of openings formed therein and are spaced from each other and further are spaced inwardly from an outer edge of the cap. The steps further include: interfitting a pair of coextensively shaped protective casings within associated ones of the openings such that a top end of each of the protective casings is disposed above a top surface of the cap while a bottom end of each of the protective casings is simultaneously disposed subjacent to the bottom surface of the cap and within the existing pipe and statically nesting a pair of linear sensor probes within associated ones of the protective casings. Each of the sensor probes has a bottom end terminating below the bottom ends of the protective casings and seated within the existing pipe while respective top ends of the protective probes are situated exterior of the protective casings and outside of the existing pipe. The steps further include connecting respective first ends of a pair of conductive leads directly to the top ends of the probes and further connecting respective second ends of the conductive leads directly to the notifying mechanism.

The method further includes the steps of: providing a medial region with a threaded outer surface; and threadably engaging a pair of locking nuts with the threaded outer surface in such a manner that a first one of the locking nuts is seated below the cap and a second one of the locking nuts is seated above the cap. Such locking nuts are abutted directly against top and bottom surfaces of the cap such that the threaded outer surface remains statically situated within a corresponding one of the openings the cap respectively. The steps further include vertically displacing each of the protective casings along a linear path defined through the openings of the cap when at least one of the locking nuts associated with each of the protective casings are threadably adapted to a loosened position.

The method further includes the steps of: providing a switch electrically coupled to the power supply source; providing a plurality of transducers housed within the case; and providing a control signal interface housed within the case and directly coupled to the leads and the transducers respectively. Such a control signal interface includes a first logic gate electrically coupled directly to the leads, a timer electrically coupled directly to the first logic gate, and a second logic gate electrically coupled directly to the timer and the first logic gate respectively. Each of sensor probes continuously generates and transmits an input signal when the water level within the existing pipe has reached the threshold water level within the existing pipe.

The steps further include: the first logic gate generating and transmitting an output signal to the second logic gate if at least one of the input signals is detected; the timer continuously generating and transmitting a timing signal to the second logic gate; and the second logic gate generating and transmitting a control signal to the transducers when the first logic gate output signal and the timing signal are received within a predetermined time interval such that the transducers are automatically activated and deactivated when the input signal is received and not received within the predetermined time interval respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a side elevational view of the detecting mechanism, fitted to a preexisting pipe, in accordance with the present invention;

FIG. 4 is a top planar view of the detecting mechanism, fitted to a preexisting pipe, in accordance with the present invention;

FIG. 7 is a schematic block diagram of the notifying mechanism, in accordance with the present invention.

DETAILED DESCRIPTION OF THE INVENTION

Figure 1:
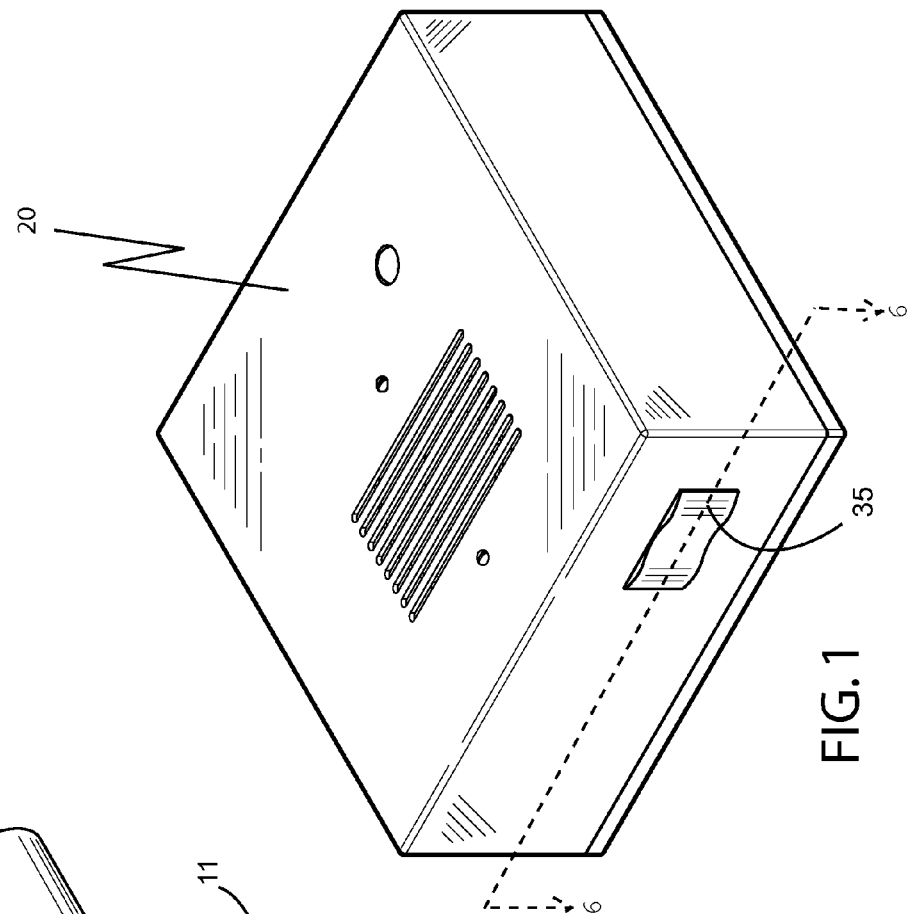
FIG. 1 is a perspective view of the portable case, in accordance with the present invention.
Figure 2:
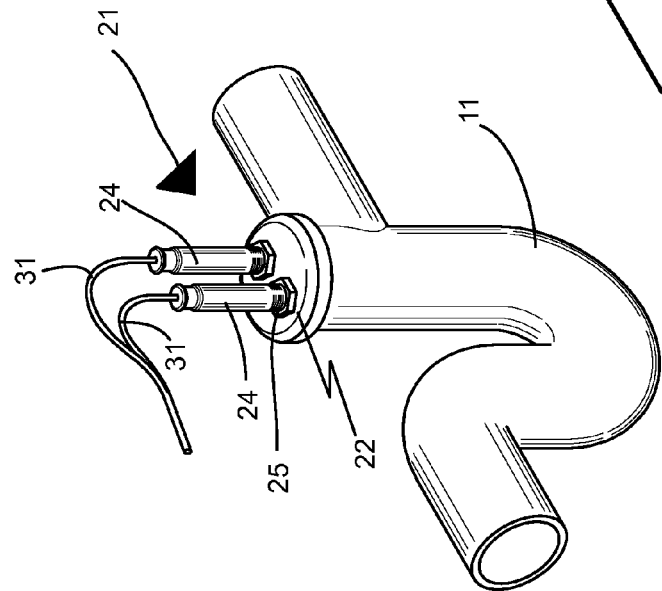
FIG. 2 is a perspective view of the detecting mechanism, fitted to a preexisting pipe, in accordance with the present invention.
Figure 5:
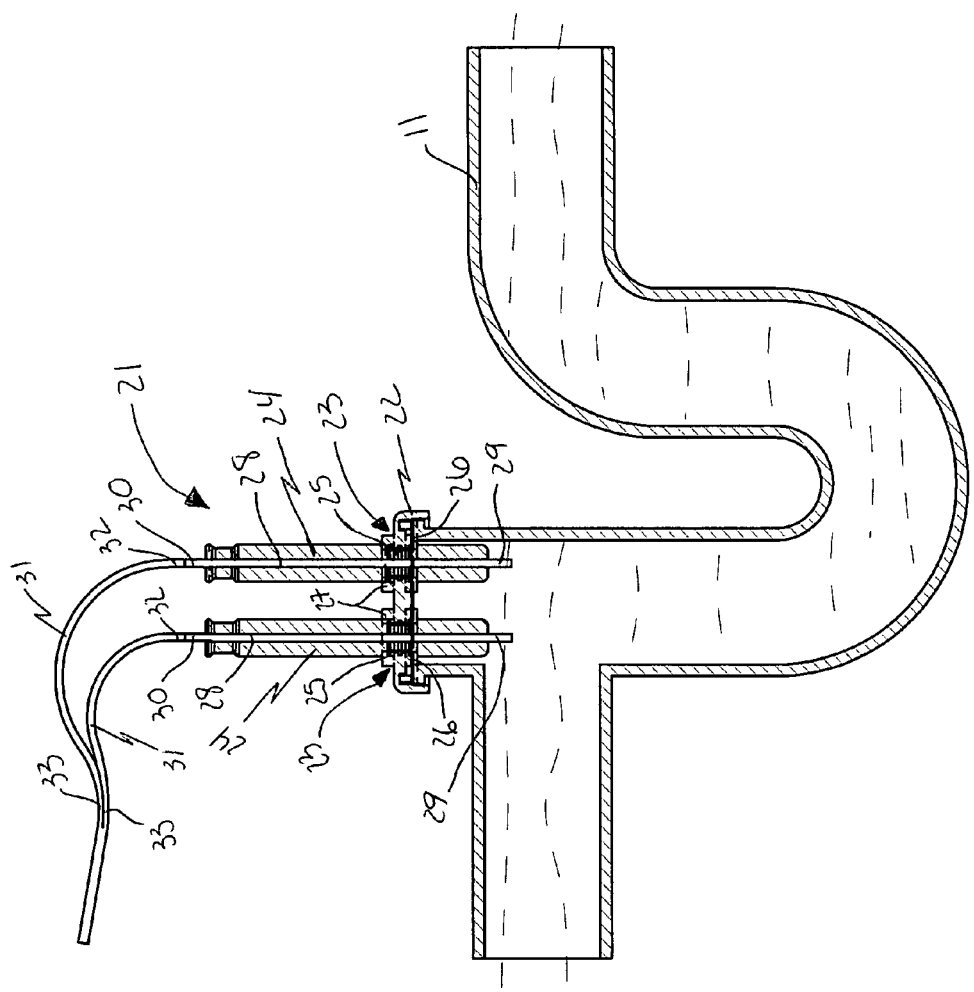
FIG. 5 is a cross sectional view, taken along line 5-5, as seen in FIG. 4.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-7 by the reference numeral 10 and is intended to provide a means for providing an alert when an existing sewage pipe and like conduits are partially blocked and experiencing reduced fluid flow therethrough. It should be understood that the system 10 may be used to detect problems in many types of plumbing devices, and should not be limited in use with only those types of plumbing devices mentioned herein.

Referring to FIGS. 1, 2, 3, 4 and 5, a sewage pipe alarm system 10 includes a portable case 20 seated exterior of the existing pipe 11. The system 10 further includes a mechanism for detecting a blockage of fluid flow within the existing pipe 11 by determining whether an internal water level within the existing pipe 11 exceeds a threshold water level within the existing pipe 11. Such a detecting mechanism 21 is connected directly, without the use of intervening elements, to the existing pipe 11 and extends downwardly therein from a top opening of the existing pipe 11. The detecting mechanism 21 is electrically coupled to the case 20 and includes a cap 22 removably affixed to the top opening of the existing pipe 11. Such a cap 22 has a pair of openings 23 formed therein. Such openings 23 are spaced from each other and further are spaced inwardly from an outer edge of the cap 22. The detecting mechanism 21 determines whether a pipe 11 is becoming overly clogged, and therefore needs service.

Referring to FIGS. 2, 3, 4 and 5, the detecting mechanism 21 further includes a pair of coextensively shaped protective casings 24 interfitted within associated ones of the openings 23 which is essential such that a top end of each of the protective casings 24 is disposed above a top surface of the cap 22 while a bottom end of each of the protective casings 24 is simultaneously disposed subjacent to the bottom surface of the cap 22 and within the existing pipe 11. Each of such protective casing 24 includes a medial region 25 provided with a threaded outer surface and a pair of locking nuts 26, 27 threadably engaged with the threaded outer surface in such a manner that a first one of the locking nuts 26 is seated below the cap 22 and a second one of the locking nuts 27 is seated above the cap 22. Such locking nuts 26, 27 are abutted directly against, without the use of intervening elements, the top and bottom surfaces of the cap 22 which is critical such that the threaded outer surface remains statically situated within a corresponding one of the openings 23 of the cap 22 respectively. Each of the protective casings 24 are vertically displaced along a linear path defined through the openings 23 of the cap 22 when at least one of the locking nuts 26, 27 associated with each of the protective casings 24 are threadably adapted to a loosened position. The protective casings 24 ensure that the detective mechanism 21 is not damaged by water or other harmful substances.

Referring again to FIGS. 2, 3, 4 and 5, the detecting mechanism 21 further includes a pair of linear sensor probes 28 statically nested within associated ones of the protective casings 24. Each of such sensor probes 28 has a bottom end 29 terminating below the bottom ends of the protective casings 24 and seated within the existing pipe while respective top ends 30 of the protective probes 28 are situated exterior of the protective casings 24 and outside of the existing pipe 11.

The detecting mechanism 21 further includes a pair of conductive leads 31 with respective first ends 32 connected directly, without the use of intervening elements, to the top ends 30 of the probes 28 and further with respective second ends 33 connected directly, without the use of intervening elements, to the notifying mechanism 34. The detecting mechanism 21 is adjustably connected to the top opening of the existing pipe 11 which is vital such that the detecting mechanism 21 is vertically displaced between alternate depths defined within the existing pipe 11. The detecting mechanism 21 is detachable from the existing pipe 11 while remaining electrically mated to the notifying mechanism 34. The probes are used to sense the water level of a pipe, thereby detecting when a pipe is clogged and in need service.

Figure 6:
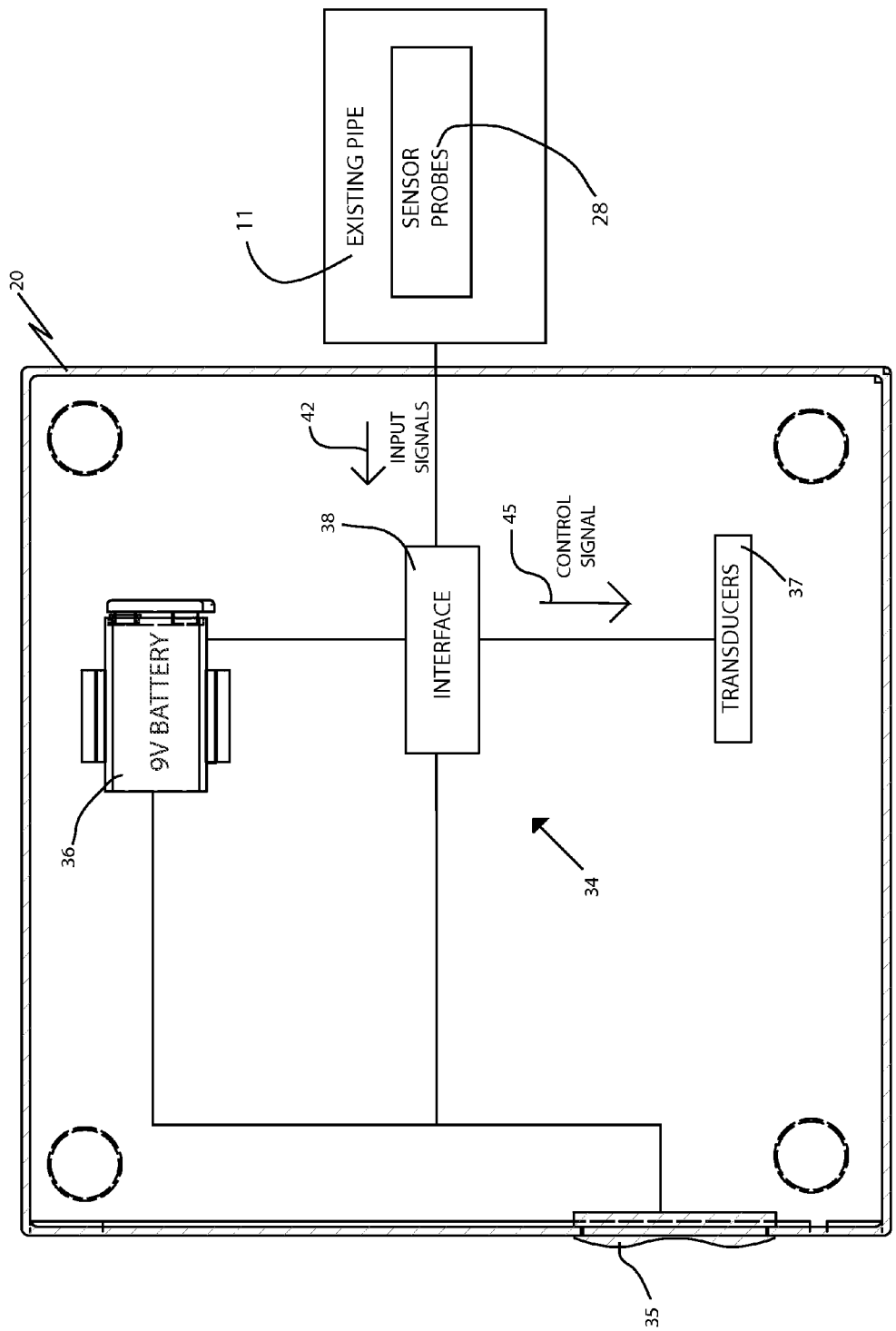
FIG. 6 is a cross sectional view, taken along line 6-6, as seen in FIG. 1.

Referring to FIGS. 6 and 7, the system further includes a mechanism for notifying a user about the blockage of the existing pipe 11. Such a notifying mechanism 34 is housed within the case 20 and electrically coupled to the detecting mechanism 21 and includes a switch 35 electrically coupled to the power supply source 36, a plurality of transducers 37 housed within the case 20, and a control signal interface 38 housed within the case 20 and directly coupled, without the use of intervening elements, to the leads 31 and the transducers 37 respectively. Such a control signal interface 38 includes a first logic gate 39 electrically coupled directly, without the use of intervening elements, to the leads 31, a timer 40 electrically coupled directly, without the use of intervening elements, to the first logic gate 39, and a second logic gate 41 electrically coupled directly, without the use of intervening elements, to the timer 40 and the first logic gate 39 respectively. The notifying mechanism 34 makes a sound that alerts a user that a pipe system may be needing service.

Each of the sensor probes 28 continuously generates and transmits an input signal 42 when the water level within the existing pipe 11 has reached the threshold water level within the existing pipe 11. The first logic gate 39 generates and transmits an output signal 43 to the second logic gate 41 if at least one of the input signals 42 is detected, and the timer 40 continuously generates and transmits a timing signal 44 to the second logic gate 41. The second logic gate 41 generates and transmits a control signal 45 to the transducers 37 when the first logic gate output signal and the timing signal 44 are received within a predetermined time interval which is necessary such that the transducers 37 are automatically activated and deactivated when the input signal 42 is received and not received within the predetermined time interval respectively. Each of the sensor probes 28 are vertically oriented and situated parallel to each other and are situated upstream of a U-shaped region in the existing pipe.

Referring to FIG. 6, the system further includes a power supply source 36 housed within the case 20. Such a power supply source 36 is electrically coupled to the detecting mechanism 21 and the notifying mechanism 34 respectively.

The detecting mechanism 21 provides the unexpected benefit of sensing when a problem occurs in a pipe system. In addition, the notifying mechanism 34 provides the unexpected benefit of alerting a user when the detecting mechanism 21 senses a problem. A sound emitted from the notifying mechanism 34 will draw a user's attention to the problem, even if the user otherwise forgets to check the status of the plumbing. Such benefits overcome the prior art shortcomings.

In use, a method for alerting a user when an existing sewage pipe 11 is partially blocked and experiencing reduced fluid flow therethrough includes the steps of: providing a portable case 20 seated exterior of the existing pipe 11; detecting a blockage of fluid flow within the existing pipe 11 by determining whether an internal water level within the existing pipe 11 exceeds a threshold water level within the existing pipe 11; and when the blockage is detected, notifying a user about the blockage of the existing pipe 11.

In use, the method further includes the steps of removably affixing a cap 22 to the top opening of the existing pipe 11. Such a cap 22 has a pair of openings 23 formed therein and are spaced from each other and further are spaced inwardly from an outer edge of the cap 22. The steps further include: interfitting a pair of coextensively shaped protective casings 24 within associated ones of the openings 23 such that a top end of each of the protective casings 24 is disposed above a top surface of the cap 22 while a bottom end of each of the protective casings 24 is simultaneously disposed subjacent to the bottom surface of the cap 22 and within the existing pipe 11 and statically nesting a pair of linear sensor probes 28 within associated ones of the protective casings 24. Each of the sensor probes 28 has a bottom end terminating below the bottom ends of the protective casings 24 and seated within the existing pipe 11 while respective top ends of the protective probes 28 are situated exterior of the protective casings 24 and outside of the existing pipe 11. The steps further include connecting respective first ends of a pair of conductive leads 31 directly, without the use of intervening elements, to the top ends of the probes 28 and further connecting respective second ends of the conductive leads 31 directly to the notifying mechanism 34.

In use, the method further includes the steps of: providing a medial region with a threaded outer surface 25; and threadably engaging a pair of locking nuts 26, 27 with the threaded outer surface 25 in such a manner that a first one of the locking nuts 26 is seated below the cap 22 and a second one of the locking nuts 27 is seated above the cap 22. Such locking nuts 26, 27 are abutted directly, without the use of intervening elements, against top and bottom surfaces of the cap 22 such that the threaded outer surface remains statically situated within a corresponding one of the openings 23 the cap 22 respectively. The steps further include vertically displacing each of the protective casings 24 along a linear path defined through the openings 23 of the cap 22 when at least one of the locking nuts 26, 27 associated with each of the protective casings 24 are threadably adapted to a loosened position.

In use, the method further includes the steps of: providing a switch 35 electrically coupled to the power supply source 36; providing a plurality of transducers 37 housed within the case 20; and providing a control signal interface 38 housed within the case 20 and directly coupled, without the use of intervening elements, to the leads 31 and the transducers 37 respectively. Such a control signal interface 38 includes a first logic gate 39 electrically coupled directly, without the use of intervening elements, to the leads 31, a timer 40 electrically coupled directly, without the use of intervening elements, to the first logic gate 39, and a second logic gate 41 electrically coupled directly, without the use of intervening elements, to the timer 40 and the first logic gate 39 respectively. Each of sensor probes 28 continuously generates and transmits an input signal when the water level within the existing pipe 11 has reached the threshold water level within the existing pipe 11.

In use, the steps further include: the first logic gate 39 generating and transmitting an output signal 43 to the second logic gate 41 if at least one of the input signals 42 is detected; the timer 40 continuously generating and transmitting a timing signal 44 to the second logic gate 41; and the second logic gate 41 generating and transmitting a control signal to the transducers 37 when the first logic gate output signal 43 and the timing signal 44 are received within a predetermined time interval such that the transducers 37 are automatically activated and deactivated when the input signal 42 is received and not received within the predetermined time interval respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A sewage pipe alarm system for alerting a user when an existing sewage pipe is partially blocked and experiencing reduced fluid flow therethrough, said sewage pipe alarm system comprising:

a portable case seated exterior of the existing pipe;

means for detecting a blockage of fluid flow within the existing pipe by determining whether an internal water level within the existing pipe exceeds a threshold water level within the existing pipe, said detecting means being connected directly to the existing pipe and extending downwardly therein from a top opening of the existing pipe, said detecting means being electrically coupled to said case;

means for notifying a user about the blockage of the existing pipe, said notifying means being housed within said case and electrically coupled to said detecting means;

a power supply source housed within said case, said power supply source being electrically coupled to said detecting means and said notifying means respectively;

wherein said detecting means is adjustably connected to the top opening of the existing pipe such that said detecting means is vertically displaced between alternate depths defined within the existing pipe;

wherein said detecting means comprises a cap removably affixed to the top opening of the existing pipe, said cap having a pair of openings formed therein, said openings being spaced from each other and further being spaced inwardly from an outer edge of said cap;

a pair of coextensively shaped protective casings interfitted within associated ones of said openings such that a top end of each of said protective casings is disposed above a top surface of said cap while a bottom end of each of said protective casings is simultaneously disposed subjacent to said bottom surface of said cap and within the existing pipe;

a pair of linear sensor probes statically nested within associated ones of said protective casings, each of said sensor probes having a bottom end terminating below said bottom ends of said protective casings and seated within the existing pipe while respective top ends of said protective probes are situated exterior of said protective casings and outside of the existing pipe;

a pair of conductive leads having respective first ends connected directly to said top ends of said probes and further having respective second ends connected directly to said notifying means;

wherein each of said protective casing comprises a medial region provided with a threaded outer surface; and a pair of locking nuts threadably engaged with said threaded outer surface in such a manner that a first one of said locking nuts is seated below said cap and a second one of said locking nuts is seated above said cap, said locking nuts being abutted directly against top and bottom surfaces of said cap such that said threaded outer surface remains statically situated within a corresponding one of said openings said cap respectively;

wherein each of said protective casings are vertically displaced along a linear path defined through said openings of said cap when at least one of said locking nuts associated with each of said protective casings are threadably adapted to a loosened position.

2. The sewage pipe alarm system of claim 1, wherein said notifying means comprises:

a switch electrically coupled to said power supply source;

a plurality of transducers housed within said case;

a control signal interface housed within said case and directly coupled to said leads and said transducers respectively, said control signal interface including a first logic gate electrically coupled directly to said leads, a timer electrically coupled directly to said first logic gate, a second logic gate electrically coupled directly to said timer and said first logic gate respectively;

wherein each of sensor probes continuously generates and transmits an input signal when the water level within the existing pipe has reached the threshold water level within the existing pipe, said first logic gate generating and transmitting an output signal to said second logic gate if at least one of said input signals is detected, said timer continuously generating and transmitting a timing signal to said second logic gate, said second logic gate generating and transmitting a control signal to said transducers when said first logic gate output signal and said timing signal are received within a predetermined time interval such that said transducers are automatically activated and deactivated when said input signal is received and not received within the predetermined time interval respectively.

3. The sewage pipe alarm system of claim 2, wherein each of said sensor probes are vertically oriented and situated parallel to each other.

4. The sewage pipe alarm system of claim 3, wherein each of said sensor probes are situated upstream of a U-shaped region in the existing pipe.

5. A sewage pipe alarm system for alerting a user when an existing sewage pipe is partially blocked and experiencing reduced fluid flow therethrough, said sewage pipe alarm system comprising:

a portable case seated exterior of the existing pipe;

means for detecting a blockage of fluid flow within the existing pipe by determining whether an internal water level within the existing pipe exceeds a threshold water level within the existing pipe, said detecting means being connected directly to the existing pipe and extending downwardly therein from a top opening of the existing pipe, said detecting means being electrically coupled to said case;

means for notifying a user about the blockage of the existing pipe, said notifying means being housed within said case and electrically coupled to said detecting means;

a power supply source housed within said case, said power supply source being electrically coupled to said detecting means and said notifying means respectively;

wherein said detecting means is adjustably connected to the top opening of the existing pipe such that said detecting means is vertically displaced between alternate depths defined within the existing pipe;

wherein said detecting means is detachable from the existing pipe while remaining electrically mated to said notifying means;

wherein said detecting means comprises a cap removably affixed to the top opening of the existing pipe, said cap having a pair of openings formed therein, said openings being spaced from each other and further being spaced inwardly from an outer edge of said cap;

a pair of coextensively shaped protective casings interfitted within associated ones of said openings such that a top end of each of said protective casings is disposed above a top surface of said cap while a bottom end of each of said protective casings is simultaneously disposed subjacent to said bottom surface of said cap and within the existing pipe;

a pair of linear sensor probes statically nested within associated ones of said protective casings, each of said sensor probes having a bottom end terminating below said bottom ends of said protective casings and seated within the existing pipe while respective top ends of said protective probes are situated exterior of said protective casings and outside of the existing pipe;

a pair of conductive leads having respective first ends connected directly to said top ends of said probes and further having respective second ends connected directly to said notifying means;

wherein each of said protective casing comprises:
a medial region provided with a threaded outer surface; and
a pair of locking nuts threadably engaged with said threaded outer surface in such a manner that a first one of said locking nuts is seated below said cap and a second one of said locking nuts is seated above said cap, said locking nuts being abutted directly against top and bottom surfaces of said cap such that said threaded outer surface remains statically situated within a corresponding one of said openings said cap respectively;

wherein each of said protective casings are vertically displaced along a linear path defined through said openings of said cap when at least one of said locking nuts associated with each of said protective casings are threadably adapted to a loosened position.

6. The sewage pipe alarm system of claim 5, wherein said notifying means comprises:
a switch electrically coupled to said power supply source;
a plurality of transducers housed within said case;
a control signal interface housed within said case and directly coupled to said leads and said transducers respectively, said control signal interface including
a first logic gate electrically coupled directly to said leads,
a timer electrically coupled directly to said first logic gate,
a second logic gate electrically coupled directly to said timer and said first logic gate respectively;
wherein each of sensor probes continuously generates and transmits an input signal when the water level within the existing pipe has reached the threshold water level within the existing pipe, said first logic gate generating and transmitting an output signal to said second logic gate if at least one of said input signals is detected, said timer continuously generating and transmitting a timing signal to said second logic gate, said second logic gate generating and transmitting a control signal to said transducers when said first logic gate output signal and said timing signal are received within a predetermined time interval such that said transducers are automatically activated and deactivated when said input signal is received and not received within the predetermined time interval respectively.

7. The sewage pipe alarm system of claim 6, wherein each of said sensor probes are vertically oriented and situated parallel to each other.

8. The sewage pipe alarm system of claim 7, wherein each of said sensor probes are situated upstream of a U-shaped region in the existing pipe.

9. A method for alerting a user when an existing sewage pipe is partially blocked and experiencing reduced fluid flow therethrough, said method comprising the steps of:
a. providing a portable case seated exterior of the existing pipe;
b. detecting a blockage of fluid flow within the existing pipe by determining whether an internal water level within the existing pipe exceeds a threshold water level within the existing pipe;
c. when the blockage is detected, notifying a user about the blockage of the existing pipe;
wherein step b. comprises the steps of:
  i. removably affixing a cap to the top opening of the existing pipe, said cap having a pair of openings formed therein, said openings being spaced from each other and further being spaced inwardly from an outer edge of said cap;
  ii. interfitting a pair of coextensively shaped protective casings within associated ones of said openings such that a top end of each of said protective casings is disposed above a top surface of said cap while a bottom end of each of said protective casings is simultaneously disposed subjacent to said bottom surface of said cap and within the existing pipe;
  iii. statically nesting a pair of linear sensor probes within associated ones of said protective casings, each of said sensor probes having a bottom end terminating below said bottom ends of said protective casings and seated within the existing pipe while respective top ends of said protective probes are situated exterior of said protective casings and outside of the existing pipe;
  iv. connecting respective first ends of a pair of conductive leads directly to said top ends of said probes and further connecting respective second ends of said conductive leads directly to said notifying means;
wherein step ii. comprises the steps of:
a. providing a medial region with a threaded outer surface; and
b. threadably engaging a pair of locking nuts with said threaded outer surface in such a manner that a first one of said locking nuts is seated below said cap and a second one of said locking nuts is seated above said cap, said locking nuts being abutted directly against top and bottom surfaces of said cap such that said threaded outer surface remains statically situated within a corresponding one of said openings said cap respectively;
c. vertically displacing each of said protective casings along a linear path defined through said openings of said cap when at least one of said locking nuts associated with each of said protective casings are threadably adapted to a loosened position.

10. The method of claim 9, wherein step c. comprises the steps of:
a. providing a switch electrically coupled to said power supply source;
b. providing a plurality of transducers housed within said case;

c. providing a control signal interface housed within said case and directly coupled to said leads and said transducers respectively, said control signal interface including
   a first logic gate electrically coupled directly to said leads,
   a timer electrically coupled directly to said first logic gate,
   a second logic gate electrically coupled directly to said timer and said first logic gate respectively;
d. each of sensor probes continuously generating and transmitting an input signal when the water level within the existing pipe has reached the threshold water level within the existing pipe;
e. said first logic gate generating and transmitting an output signal to said second logic gate if at least one of said input signals is detected;
f. said timer continuously generating and transmitting a timing signal to said second logic gate; and
g. said second logic gate generating and transmitting a control signal to said transducers when said first logic gate output signal and said timing signal are received within a predetermined time interval such that said transducers are automatically activated and deactivated when said input signal is received and not received within the predetermined time interval respectively.

11. The method of claim 9, wherein each of said sensor probes are vertically oriented and situated parallel to each other.

12. The method of claim 9, wherein each of said sensor probes are situated upstream of a U-shaped region in the existing pipe.

* * * * *